(12) United States Patent
Pérez-Díaz et al.

(10) Patent No.: US 11,862,388 B2
(45) Date of Patent: Jan. 2, 2024

(54) INTRINSICALLY SAFE ELECTROMAGNETIC DEVICES

(71) Applicants: COUNTERFOG CORPORATION, Irving, TX (US); XTRACTION SCIENCE AND TECHNOLOGY, INC., South Park, PA (US)

(72) Inventors: José Luis Pérez-Díaz, Valdemoro (ES); Steven A. Cotten, Lockport, NY (US)

(73) Assignees: COUNTERFOG CORPORATION, Irving, TX (US); XTRACTION SCIENCE AND TECHNOLOGY, INC., South Park, PA (US)

( * ) Notice: Subject to any disclaimer, the term of this patent is extended or adjusted under 35 U.S.C. 154(b) by 185 days.

(21) Appl. No.: 17/576,415

(22) Filed: Jan. 14, 2022

(65) Prior Publication Data

US 2023/0230758 A1    Jul. 20, 2023

(51) Int. Cl.
| | | |
|---|---|---|
| H01F 27/30 | (2006.01) | |
| H02K 11/30 | (2016.01) | |
| H01F 27/24 | (2006.01) | |
| H01F 7/08 | (2006.01) | |
| F16K 31/04 | (2006.01) | |

(52) U.S. Cl.
CPC ............ *H01F 27/30* (2013.01); *H01F 7/081* (2013.01); *H01F 27/24* (2013.01); *H02K 11/30* (2016.01); *F16K 31/04* (2013.01)

(58) Field of Classification Search
CPC .......... H01F 27/30; H01F 7/081; H01F 27/24; H02K 11/30; H02K 2203/09; H02K 3/325; H02K 3/345; H02K 3/28; F16K 31/04

See application file for complete search history.

(56) References Cited

U.S. PATENT DOCUMENTS

| | | |
|---|---|---|
| 2002/0047438 A1 | 4/2002 | Leijon |
| 2004/0184204 A1 | 9/2004 | Dooley |
| 2006/0250037 A1 | 11/2006 | Kummlee |
| 2011/0109188 A1* | 5/2011 | Shaver .............. H02K 3/34 |
| | | 310/215 |

(Continued)

FOREIGN PATENT DOCUMENTS

EP    3056427 B1    6/2020

OTHER PUBLICATIONS

International Search Report and the Written Opinion, PCT/US23/10681, dated Mar. 23, 2023, 9 pages.

*Primary Examiner* — Mohamad A Musleh
(74) *Attorney, Agent, or Firm* — Edell, Shapiro & Finnan, LLC

(57) ABSTRACT

Disclosed is a design approach for intrinsically safe electromagnetic devices such as electrically actuated valves, motors, generators, or transformers intended for and capable of safe operation in explosive atmospheres or environments. The design employs a plurality of electrically insulated, intrinsically safe circuits cooperating to induce, or in the case of a generator, create a relatively large magnetic flux in the ferromagnetic core, or iron, of these devices. A method to construct such intrinsically safe devices is disclosed. These devices can be practically used in machines, mechanisms, valves, and manned or unmanned vehicles intended for safe operation in hazardous environments, for example underground coal mines or ATEX or EX classified facilities.

20 Claims, 12 Drawing Sheets

(56) References Cited

U.S. PATENT DOCUMENTS

2013/0277987 A1     10/2013   Cardenas Riojas
2018/0254679 A1*    9/2018   Bernhardt ................ H02K 3/14
2020/0067367 A1      2/2020   Braun et al.
2020/0395810 A1    12/2020   Tiburski Junior

* cited by examiner

INTRINSICALLY SAFE ELECTROMAGNETIC DEVICES

GOVERNMENT RIGHTS

Part of the work performed during development of this invention utilized U.S. Government funds. The U.S. Government may have certain rights in the invention.

FIELD

The present invention is directed to the design of electromagnetic devices such as electrically actuated valves, motors, generators, or transformers intended for and capable of safe operation in explosive atmospheres or environments. The devices can be used in machines, mechanisms, valves, and manned or unmanned vehicles intended for operation in such environments, as for example underground coal mines or ATEX or EX classified facilities.

BACKGROUND

It is sometimes necessary or desirable to employ electromagnetic devices such as rotating motors or actuators and their associated power distribution and control devices in areas or locations where explosive gases or combustible dusts or mists may be present. Such areas are commonly found in oil refineries, chemical plants, petroleum storage areas, gas emitting underground mines, flour mills, grain elevators, and paint shops. To enable safe device operation while preventing catastrophic ignition of potentially explosive atmospheres, the electrical and thermal energy of the devices must be either isolated from contact with the flammable materials or limited so that any unanticipated contact has insufficient energy to cause an ignition. Additional safety concerns common to both the energy isolation and energy limitation protection concepts include equipment operation that cannot build up external static electric charge or introduce elevated exposed surface temperatures, both of which could also lead to an ignition.

There are several industry-proven and accepted means to achieve energy isolation. These include designing enclosures tight enough to prohibit ingress of the hazardous gases and materials. Such enclosures are also strong enough to initially contain any internal explosion while venting the explosion flame through a path sufficient to cool or quench the flame temperature below ignition levels before reaching outside of the enclosure (examples: U.S. Pat. Nos. 4,174,013, 8,512,430). Depending upon the specific environmental conditions of its intended application, additional device protection may be achieved by pressurizing the interior of the enclosure with inert gas (example: U.S. Pat. No. 5,753,986) or filling the enclosure with other materials (oil, sand) to prohibit the ingress of hazardous materials. Potentially incendive non-moving components of electrical devices may also be coated with inert compounds (encapsulates) of sufficient thickness and durability to insure that stray energy does not escape.

Pertinent standards and regulations govern the types of the energy isolation devices that may be employed in potentially explosive environments. For example, Articles 500-504 of the NFPA 70 (National Electric Code) and Underwriter's Laboratories, Inc. Standard for Safety 674 set forth requirements for devices to be used in "Hazardous Locations." These and other international and US requirements such as those contained in Title 30 of the Code of Federal Regulations (CFR 30) define the necessary attributes of and use restrictions for energy isolation devices characterized as "explosion-proof" or "XP".

All safeguarding means for energy isolation require the addition of protective materials around the device over and above that required for its basic operation. Thus, the designs of these XP devices are generally larger and more massive than comparably capable units intended for operation in non-hazardous locations. For most stationary or fixed equipment installations, the additional size and mass of explosion-proof electrical devices rarely presents a problem. However, for mobile or portable equipment applications, XP device use may introduce significant physical impediments for units intended to operate efficiently, effectively, and safely in hazardous environments.

The second means of designing electrical equipment that can operate safely in hazardous environments is to limit the electrical energy of that equipment such that any unintended energy release is insufficient to cause an ignition. A device or system design that achieves this objective is considered "intrinsically safe", or "IS". The entire power regime of an IS system must be controlled meaning that the energy contained in all its resistive, inductive, and capacitive components either alone or in combination under fault conditions cannot generate an unintended energy discharge (a spark) above a specified level. IS equipment may therefore be both more compact and lighter than comparable XP units, both desirable attributes for mobile or portable devices. However, ignition energy safety thresholds do restrict the available power that an IS device operating in a hazardous location can provide.

Existing ATEX and EX safety standards classify hazardous areas by gas groups according to their flammability and zones according to the probability of presence of flammable materials. Among these zones the most hazardous Zone 0 where an explosive gas-air mixture is continuously present or present for long periods. Again, industry standards and government regulations like ACRI 2001 and Title 30 of the Code of Federal Regulations (CFR) in the United States prescribe requirements for how IS equipment must be designed, constructed, and maintained to insure safe operation.

The primary IS protection method accepted for Zone 0 devices is based on the limitation of power available for creating a spark in the instance of two simultaneous electrical circuit failures. In case a circuit suffers a break and the circuit becomes open or there is occasion for an abnormal current diversion, the device design must ensure that the available power for generating a spark between the portions of the open circuit or between any two parts where the current may be diverted is always under the Zone 0 atmosphere's ignition threshold. The design of an IS device must consider both the physical separation of components along with the maximum possible voltage and current of those components.

Physical separation of conductive parts is mandated to prevent diversion of current and ignition of an explosive atmosphere. Two types of separation are considered for prevention of spark generation: "clearance distance" is the shortest distance between two conductive parts measured through air; "creepage distance" is the shortest distance between two conductive parts measured along the surface of the insulating material separating them. In addition, insulation separation must be evaluated for conductors housed in separate single- or multi-conductor cables along with the possible use of grounded metal or insulating partitions between conductors. Generally, the minimum mandated requirements for separation are based on three factors:

location of the circuits, voltage of the circuits, and the material between the conductors.

If conductors are adequately separated according to the prescribed voltage-based requirements, those conductors are not considered in the two simultaneous electrical circuit fault analysis employed to assess intrinsic safety.

Electrical devices like motors, electrically activated valves, generators, transformers and other electromechanical devices often incorporate conductive wire coils wound around a ferromagnetic core (also commonly called an "iron"). Such coils fall in the category of electric circuits with inductive components. Inductive circuit components can store energy that can be released to ignite an explosive atmosphere in the instance of a circuit fault even if the circuit's power source suddenly shuts off Therefore, an electrically powered IS device design must also recognize the requirement to maintain stored power at a level less than that required to generate an incendive spark in the case of accidental opening or diversion of the circuit. The previously mentioned codes and regulations offer voltage versus current limit curves that correspond to safe energy limits. The ignition limits depend on the kind of explosive environment (incendive powder, liquid, or gas and temperature), in which the device is intended and, ultimately, approved to operate.

In conclusion, common electrical device designs were initially developed to function in non-hazardous locations. Those early designs have evolved as new component materials have become available and more elaborate power control schemes have been developed. The result is that electrical device designs, still intended for non-hazardous locations, have become more powerful, responsive, and energy efficient than their predecessors. One such example are the electrical motors now employed to drive propellers on small unmanned aerial vehicles. However, while the means to enable electrical devices to function safely in hazardous locations may also have been refined over time, they have not changed fundamentally. Therefore, the latest, most efficient XP devices still remain more massive than their standard design counterparts, and current IS devices must still function within known energy restrictions which limits the power and the power density that they can deliver. The increased mass and power restrictions generally precludes the use of current XP and IS devices in many applications where light weight or an equivalent high energy density is required, as in the small unmanned aerial vehicle example.

The intent of the present application is to disclose an approach to the design of IS electromagnetic devices capable of either safely providing greater mechanical power and power density than IS devices presently intended for operation in environments with potentially explosive atmospheres or safely generating electrical power within such hazardous environments.

SUMMARY

The present invention includes types of intrinsically safe (IS) electromagnetic devices for use in explosive atmosphere zones that are capable of either delivering greater mechanical power and power density than existing IS devices or for safely generating electrical power. Such IS devices can be employed in machines, mechanisms, drivers, valves, and manned or unmanned vehicles operated in environments with explosive atmospheres like gassy underground mines or ATEX or EX classified facilities.

According to some implementations, intrinsically safe electromagnetic devices are provided that include one or more irons, or ferromagnetic cores, each of them being provided with an electrical insulator cover or layer, whose slots are wound with a plurality of independent safe wire coils provided with electrical insulator materials in between the different coils. When the devices are employed to produce mechanical power, each of the safe coils is connected to an independent electrical power supply with its maximal voltage and short-circuit current being under the appropriate ignition limits corresponding to the electrical circuits of the safe wire coils. When employed to create electrical energy, the energy produced by each of the safe coils is similarly limited. These and other features of the disclosed implementations are described in detail below, in view of the figures, which are a part of this specification.

In an alternative mechanical power delivery implementation, a set of safe coils or windings of different slots can be connected in series or in multiphase arrangement to a single electrical power supply with a maximal voltage and short-circuit current being under the limit ignition curves corresponding to the total equivalent inductance of the set of safe coils or windings of different slots, and exclusively connected to such a set of safe coils comprising at the most a coil or winding per slot.

DETAILED DESCRIPTION

The function of electromagnetic devices such as electrically actuated valves, motors, generators, or transformers is enabled by the controlled magnetization of ferromagnetic cores, or "irons", made of ferromagnetic materials, preferably laminated. Typically, the stator of a conventional permanent magnet electric motor is made of a plurality of arms of irons each wound with a coil of wire. Current flowing through the coil creates a magnetic field. The presence of the iron or ferromagnetic material with a high magnetic permeability enhances the strength of the coil's magnetic field to provide a larger magnetic flux density. The magnetic flux in the arm then either attracts or repulses the permanent magnets mounted in the rotor of the motor creating a force that produces the desired mechanical motion. Conversely in a typical electrical generator, when the rotor spins, the motion of its permanent magnets induces in each arm of iron a varying magnetic flux and subsequently in each coil, a varying current and voltage.

Figure 1A:
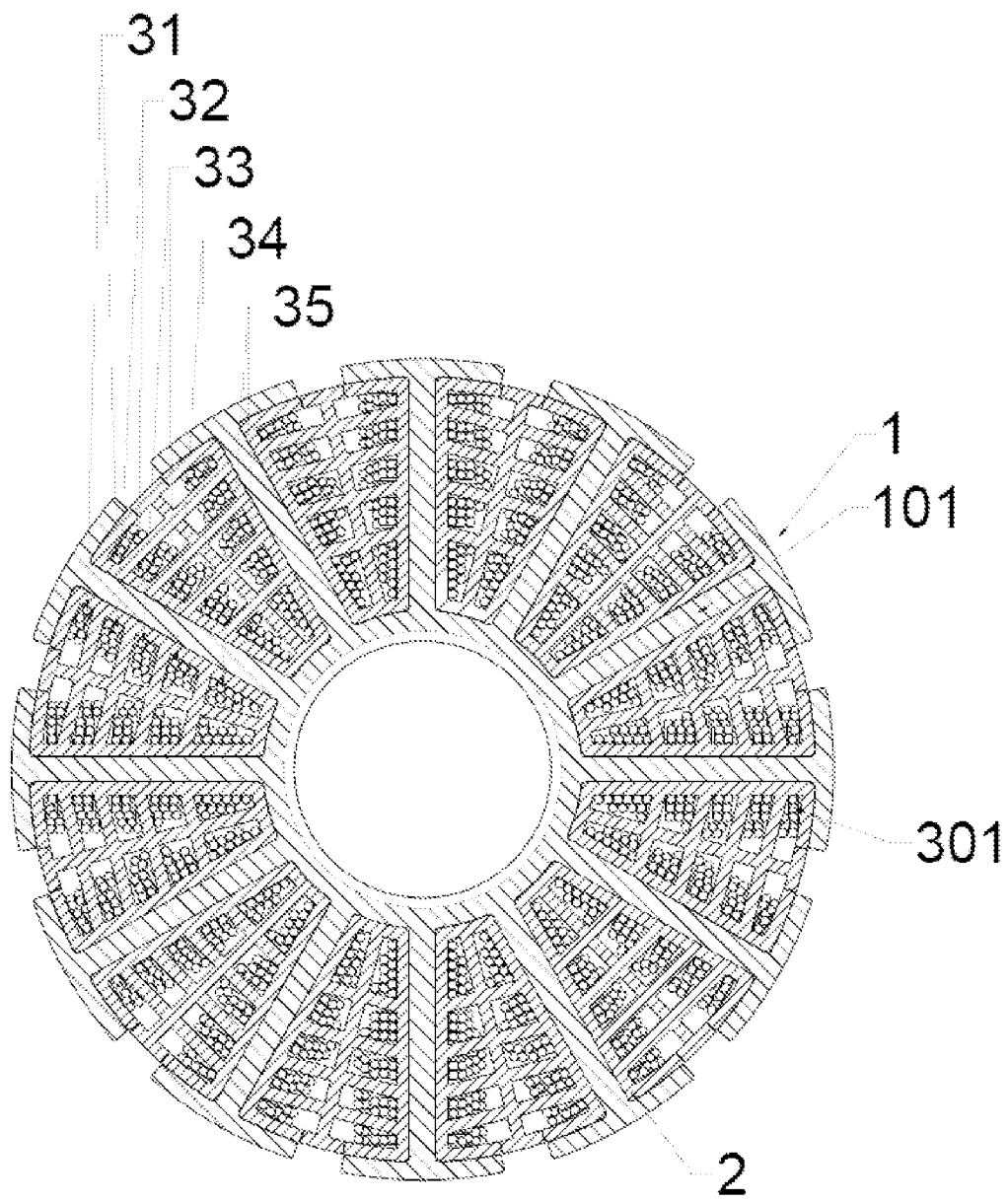
FIG. 1A is a cross-section of a stator (non-moving component) of an intrinsically safe 12-pole electrical motor according to one implementation.

Implementations disclosed and contemplated herein divides the single set of conventional wire coil windings into multiple sets of smaller independent and electrically isolated safe windings (31, 32, 33 . . . ) wrapped around the arms 101 of the iron 1. FIG. 1A is a cross-section of a stator (non-moving component) of an intrinsically safe 12-pole electrical motor according to one implementation. The rotor 7 or 8 (moving component) assembly housing multiple permanent magnets are shown in FIGS. 1C and 1D. The stator cross section shows an iron (ferromagnetic core) 1, featuring twelve centrally connected T-shaped arms 101, sets of electrical insulating layers 2 between each arm 101, and five separate safe wire windings 31, 32, 33, 34, 35 wound around each iron arm 101, featuring multiple turns of wire 301 for each safe winding 31, 32, 33, 34, 35.

Figure 1B:
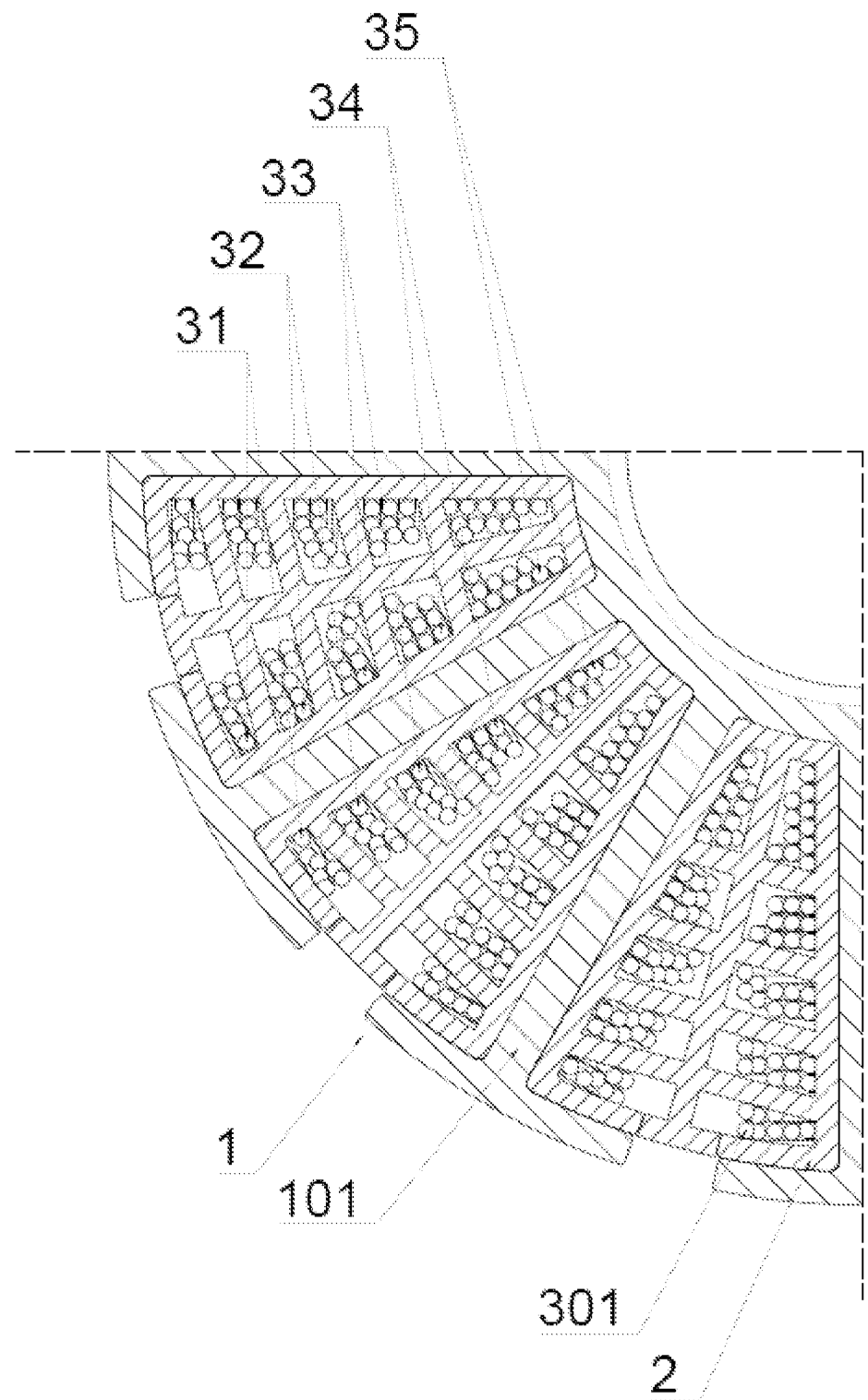
FIG. 1B shows a magnified detail of the cross-section of the stator of FIG. 1A
Figure 1C:
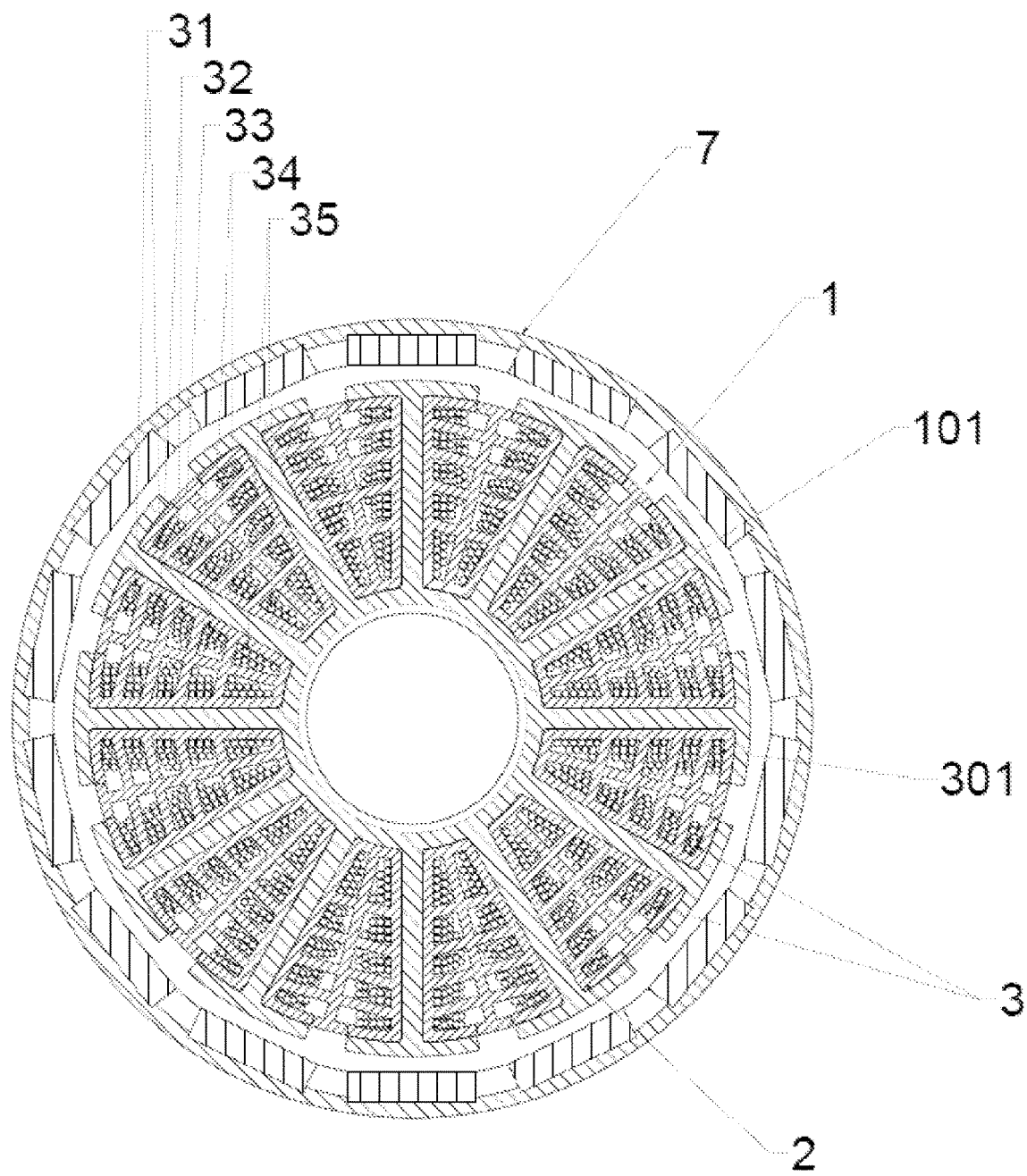
FIG. 1C shows a cross-section of an intrinsically safe electrical motor composed of the stator shown in FIG. 1A and an external rotor with permanent magnets.
Figure 1D:
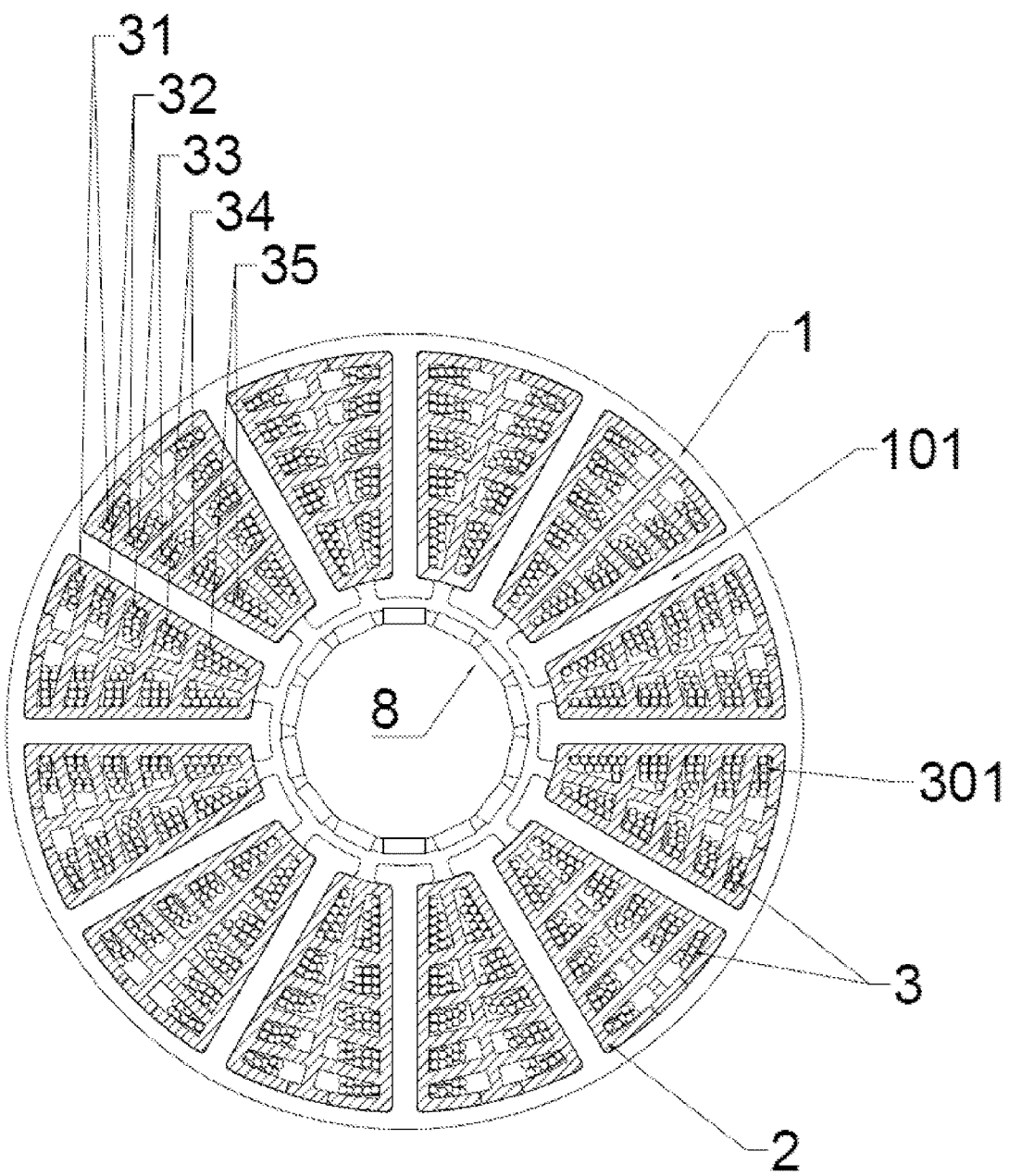
FIG. 1D shows a cross-section of an intrinsically safe electrical motor composed of the stator FIG. 1A with an internal rotor with permanent magnets.

According to some implementations, the five separate safe wire windings are electrically isolated from the arms 101 and from one another and by a monolithic structure 2 made of an electrical insulating material as shown in FIG. 1B.

Figure 9:
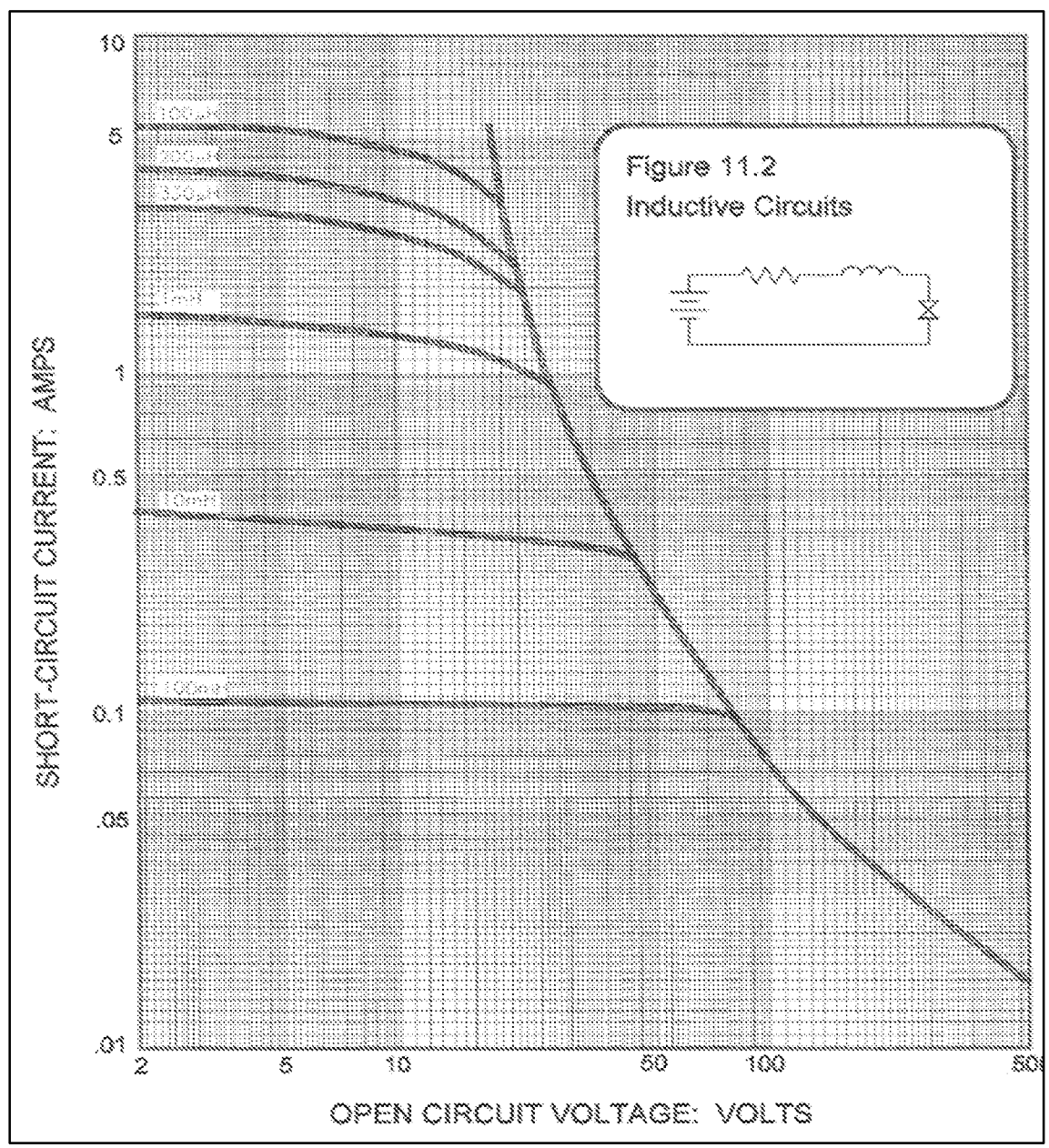
FIG. 9 show ignition curves (short circuit current vs. open circuit voltage) for inductive circuits.

Voltage and current applied to every safe winding (31, 32, 33 . . . ) is limited to the maximum values obtained from the applicable ignition curves for electrical circuits having equivalent inductance, resistance, and capacitance to those of each safe winding circuit. Page 52 of the ACRI2001 document (version: 2008 Nov. 4), shows the ignition curves (short circuit current vs. open circuit voltage) for inductive circuits. See also FIG. 9. An electrical or electronics circuit is considered intrinsically safe if the maximum short circuit current possible—as for example in case a point of the circuit breaks—and the maximum open circuit voltage of their power sources (considered all together if there were several of them) remain below the ignition curve corresponding to the inductance in the circuit. ACRI2001 is published by the U.S. Department of Labor, Mine Safety and Health Administration and sets forth the "CRITERIA FOR THE EVALUATION AND TEST OF INTRINSICALLY SAFE APPARATUS AND ASSOCIATED APPARATUS". ACRI2001 is incorporated herein by reference in its entirety.

When appropriately energized, the cooperative effect of all the safe windings around the same iron arm and all the individual motor arms will create magnetic fields and magnetize the motor's iron core in a manner providing a magnetic flux and associated mechanical power similar to conventional electromagnetic devices while preventing any current diversions capable of igniting an explosion. Each safe winding will not exceed the corresponding ignition limits for voltage and current. In the instance where the rotor moves so that the device behaves as a generator, the voltage and current generated by the windings will remain lower than the ignition limit, even spinning at the maximum speed of the rotor, as there is a symmetrical physical behavior between motor function and generator function. In other words, the specified number of turns associated with each safe winding (31, 32, 33 . . . ) limits the power that can be generated by each safe winding (31, 32, 33 . . . ) so that it must remain below the ignition threshold of any present explosive gases or combustible dusts or mists provided the magnetization oscillation frequency (i.e. speed of the rotor in the case of a motor) does not exceed its maximum design limit.

The safe windings (31, 32, 33 . . . ) are additionally electrically insulated by sets of electrical insulating layers 2 inserted between them preventing potential current deviations or short-circuits. The thickness of the electrical insulating layers 2 of the present invention are thick enough to prevent current deviation in the worst voltage condition, and are typically thicker than a minimum value mandated by the applicable regulations for the nominal circuit voltage. Similarly, the iron 1 and iron arms 101 are also insulated from the safe windings (31, 32, 33 . . . ) by sets of electrically insulating layers 2 with a thickness necessary to prevent current diversion or short circuits between them.

Figure 2:
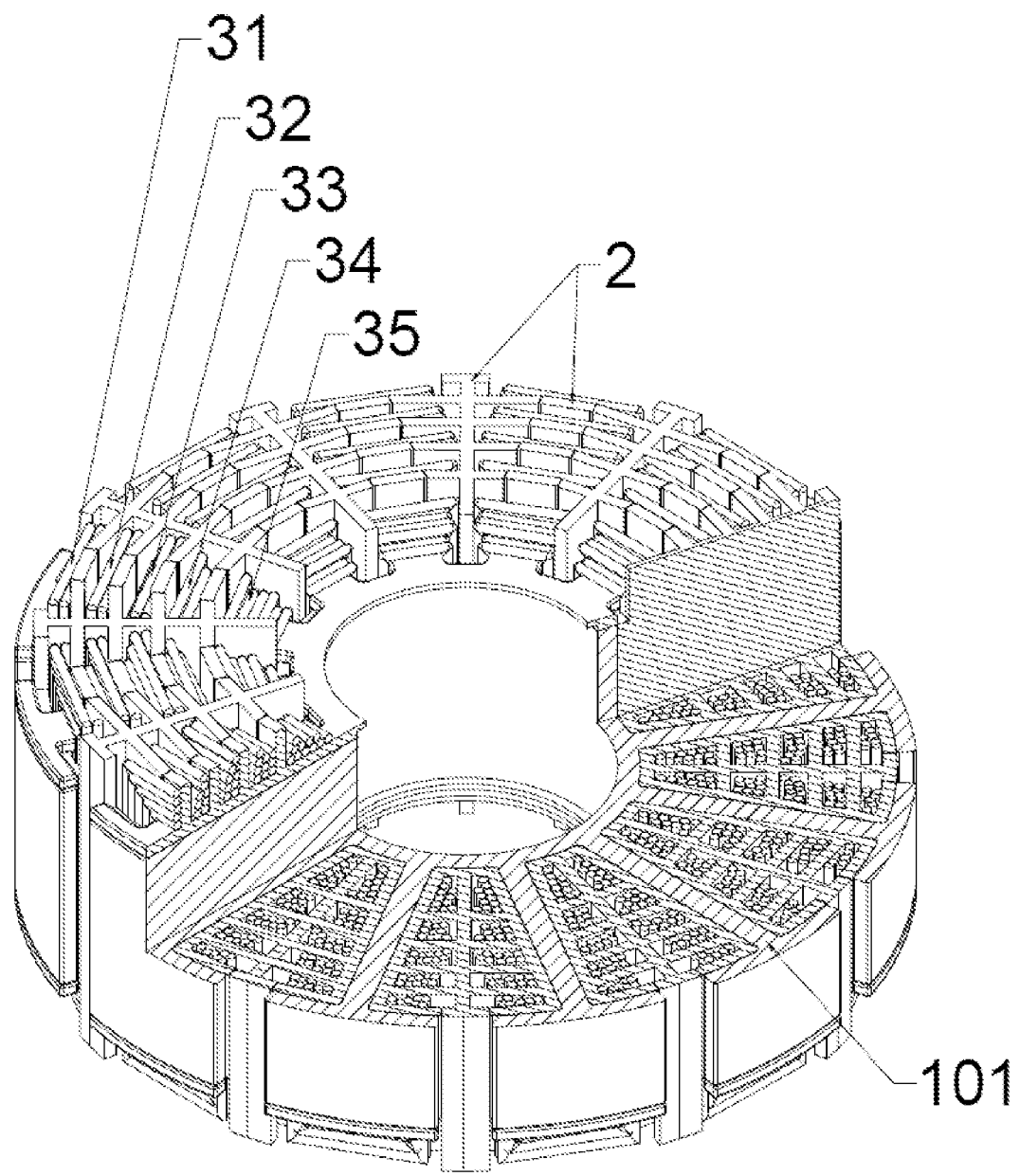
FIG. 2 shows a three-dimensional and sectioned view of a motor stator according to one implementation.

FIG. 2 shows a three-dimensional and sectioned view of only the motor stator (again without a rotor). The drawing indicates the five separate safe windings (31, 32, 33, 34, 35) wound around each T-shaped arm 101, each in a separate insulated compartment defined by the insulating layers 2. These insulated layers 2 are shown to be higher than the windings ensuring a creepage distance between windings greater than a minimum value required by explosive atmosphere regulations. Interconnections between coils are not shown.

In the present invention every single set of safe windings (31, 32, 33 . . . ) is connected to an independent intrinsically safe circuit. Safe windings (31, 32, 33 . . . ) are connected to safe windings around other arms according to the well-known, conventional rules for construction of multiphase electromagnetic devices, for instance employing either "Δ" or "Y" three-phase circuit connections. In this way, an intrinsically safe circuit will contain no more than a single safe winding (31, 32, 33 . . . ) wound around a single iron arm 101.

Figure 8:
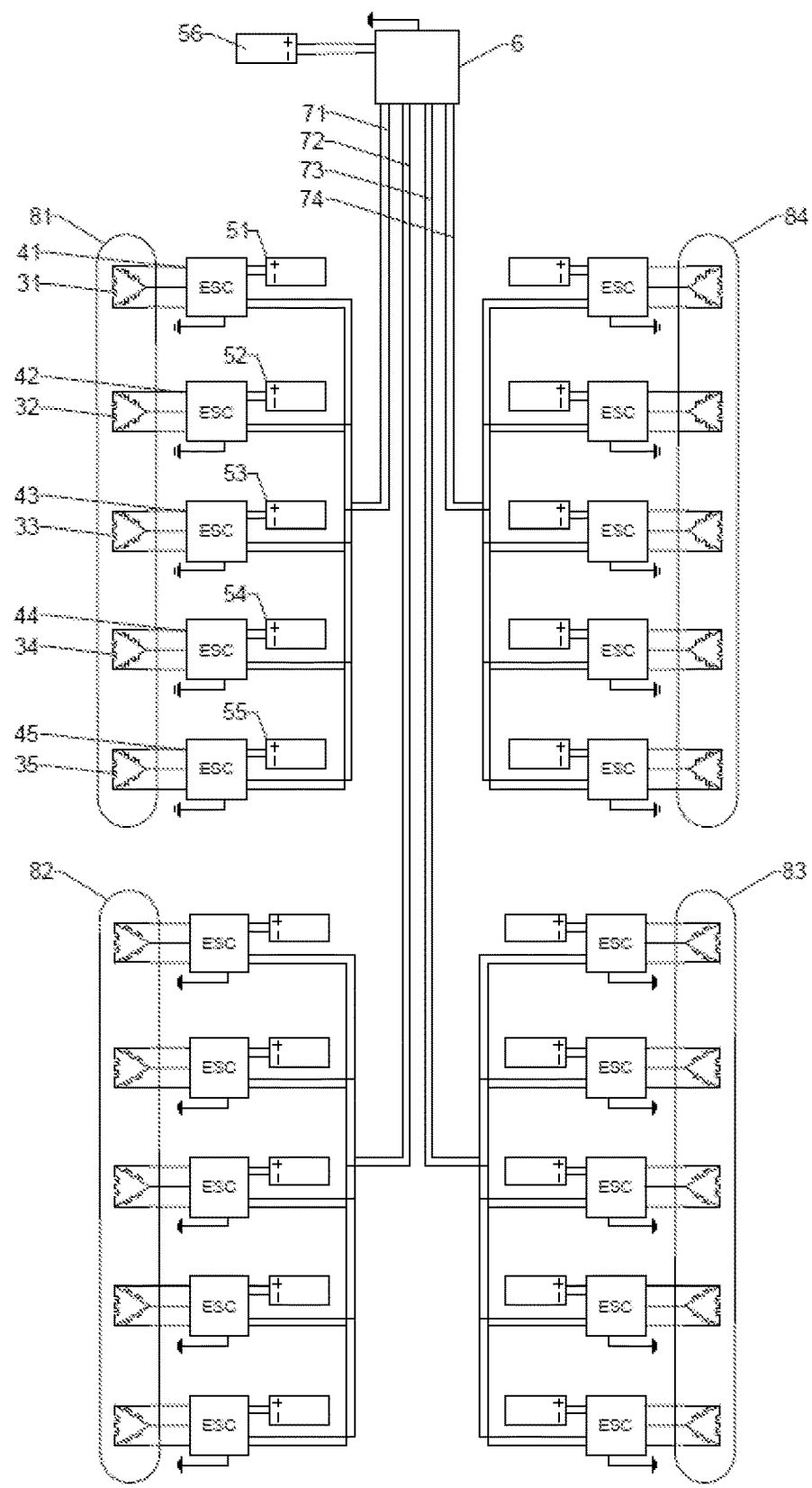
FIG. 8 is a diagram of the electrical connections envisioned for an implementation of an application of four intrinsically safe motors employed to power an unmanned aerial vehicle.

FIG. 8 is a diagram of the electrical connections envisioned for an implementation of an application of four intrinsically safe motors (81, 82, 83, 84) employed to power an unmanned aerial vehicle. Every single set of safe windings (31, 32, 33, 34, 35) is connected separately and respectively to an independent intrinsically safe electronic speed controller (41, 42, 43, 44, 45) which is each respectively powered by an independent intrinsically safe direct current (DC) battery (51, 52, 53, 54, 55). (In the context of the present invention, an intrinsically safe power supply, such as an intrinsically safe battery, is one having a maximal voltage and short-circuit current that is less than limits specified as necessary to prevent ignition of explosive atmospheres or materials.) A flight controller 6 sends the four control signals corresponding to the four intrinsically safe motors (81, 82, 83, 84) through respective insulated cables (71, 72, 73, 74). Each of the separate motor control signals is provided to the five electronic speed controllers (41, 42, 43, 44, 45) of each intrinsically safe motor (81, 82, 83, 84). Only those of motor 81 are numbered in FIG. 8. The controller 6 is powered by an independent intrinsically safe battery 56.

As explained above, the implementation of FIG. 8 includes a set of safe windings 31 is connected to an electronic speed controller 41 which is powered by an independent intrinsically safe direct current (DC) battery 51. A second set of safe windings 32 is connected to an electronic speed controller 42 which is powered by an independent intrinsically safe battery 52. This circuit architecture can be repeated to create as many intrinsically safe circuits as needed for a given application.

In an implementation of an intrinsically safe permanent magnet motor, the electrical insulating layers 2 to space safe windings (31, 32, 33 . . . ) in the stator may be configured as independent strips or as assemblies combining several strips that can be inserted axially before completing the coil winding process. This insulation configuration offers the advantage of ensuring effective insulation while potentially being efficient to manufacture and assemble.

Figure 3:
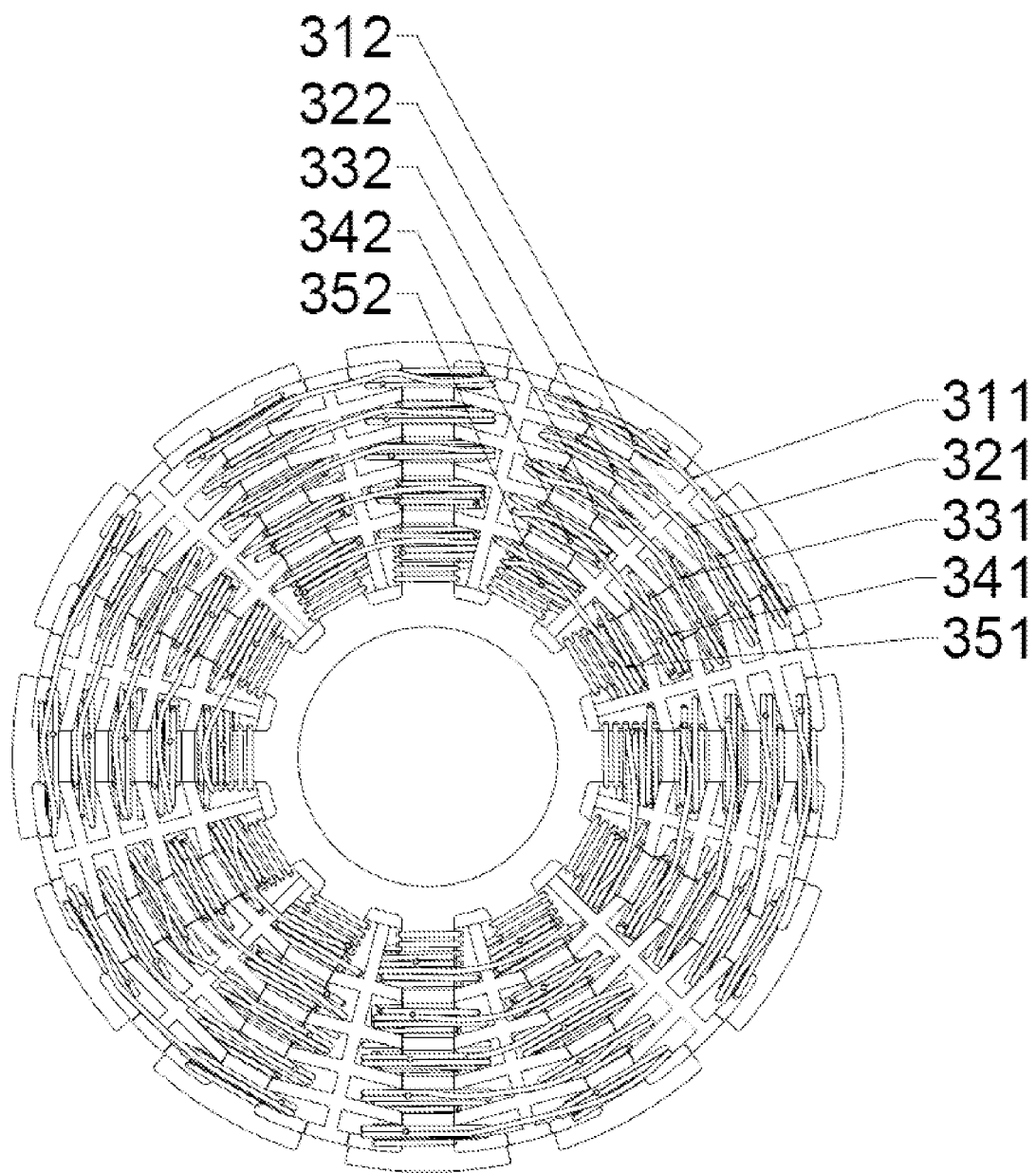
FIG. 3 is a top view of a motor stator and indicating the necessary isolation of neighboring safe windings and their "Δ" connections wires corresponding to a three-phase delta motor circuit configuration.

FIG. 3 shows a top view of the motor stator (without a rotor) indicating the necessary isolation of neighboring safe windings and their "Δ" connections wires (311, 321, 331, 341, 351) whose path is essentially contained in a transverse plane and associated axial "Δ" connection wires (312, 322, 332, 342, 352); as corresponding to a three-phase delta motor circuit configuration.

Additionally, as shown in FIGS. 4-7, an implementation for a three-phase intrinsically safe permanent magnet motor will be provided with a series of insulating caps (91, 92, 93 and 94) characterized by having their individual thicknesses equal to or greater than the minimum thickness required to prevent current deviation for the applied voltage and additionally provided with holes to let some wires cross it axially and provided with concentric circular grooves where other wires and their connections are hosted.

Figure 4:
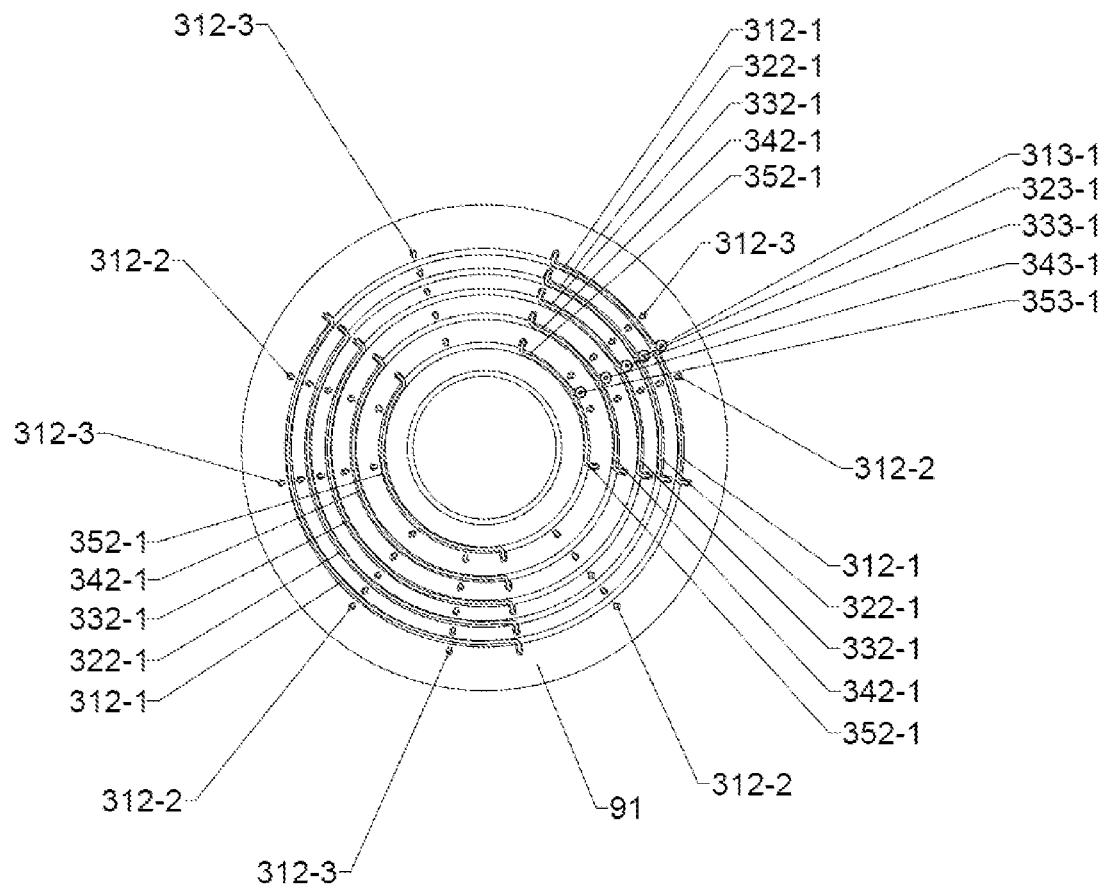
FIG. 4 is a top view of the motor stator of FIG. 3 additionally covered by a first insulating layer lid.

In such an implementation for the case of a motor with either "Δ" or "Y" circuit connections, as shown in FIG. 4 the first insulating layer 91 is placed to cover the nearest neighboring safe winding circuit connection wires (311, 321, 331, 341, 351) the trajectory of which is contained in an essentially transverse plane. Insulating layer 91 will be provided with holes to let axial connection wires (312, 322, 332, 342, 352) to pass through. The first insulating layer lid 91 is provided with a set of concentric circular grooves where a first set of safe winding "Δ" connection wires (312-1, 322-1, 332-1, 342-1, 352-1) lie and are connected to a set of first phase axial insulated wires (313-1, 323-1, 333-1, 343-1, 353-1) as well as the other two sets of still axial safe windings "Δ" connection wires (312-2, 322-2, 332-2, 342-2, 352-2) and (312-3, 322-3, 332-3, 342-3, 352-3).

Figure 5:
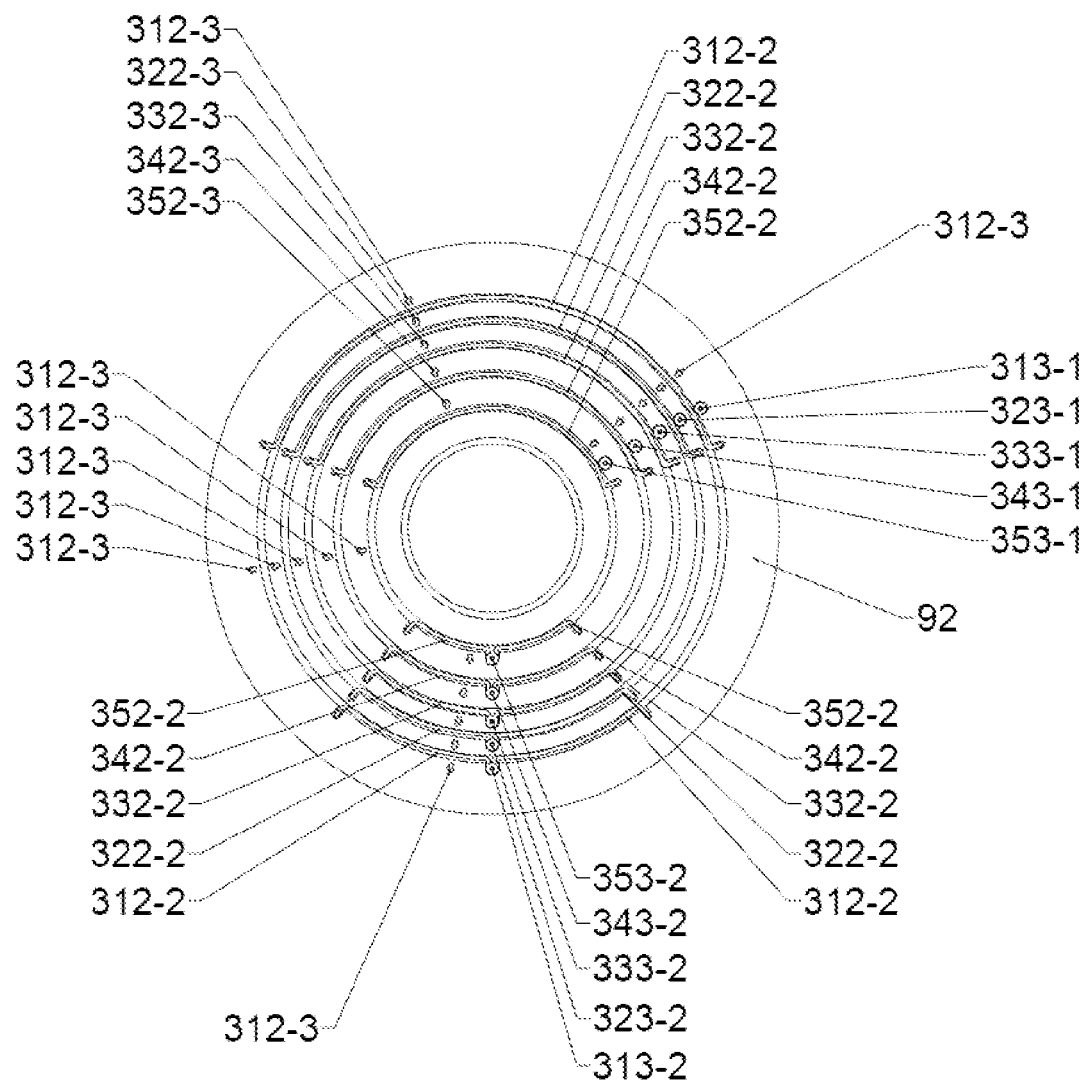
FIG. 5 is a top view of the motor stator of FIG. 4 additionally covered by a second insulating layer lid.

As shown in FIG. 5, a second insulating layer lid 92 is placed on top of the layer lid 91 and the abovementioned first set of safe windings "Δ" connection wires (312-1, 322-1, 332-1, 342-1, 352-1), and provided with holes to let the set of first phase axial insulated wires (313-1, 323-1, 333-1, 343-1, 353-1) as well as the second set of safe windings "Δ" connection wires (312-2, 322-2, 332-2, 342-2, 352-2) and third set of safe windings "Δ" connection wires (312-3, 322-3, 332-3, 342-3, 352-3) to cross though the cap layer 92. The insulating layer lid 92 is additionally provided with a set of concentric circular grooves where a second set of safe windings "Δ" connection wires (312-2, 322-2, 332-2, 342-2, 352-2) lie and are connected to a set of second phase axial insulated wires (313-2, 323-2, 333-2, 343-2, 353-2).

Figure 6:
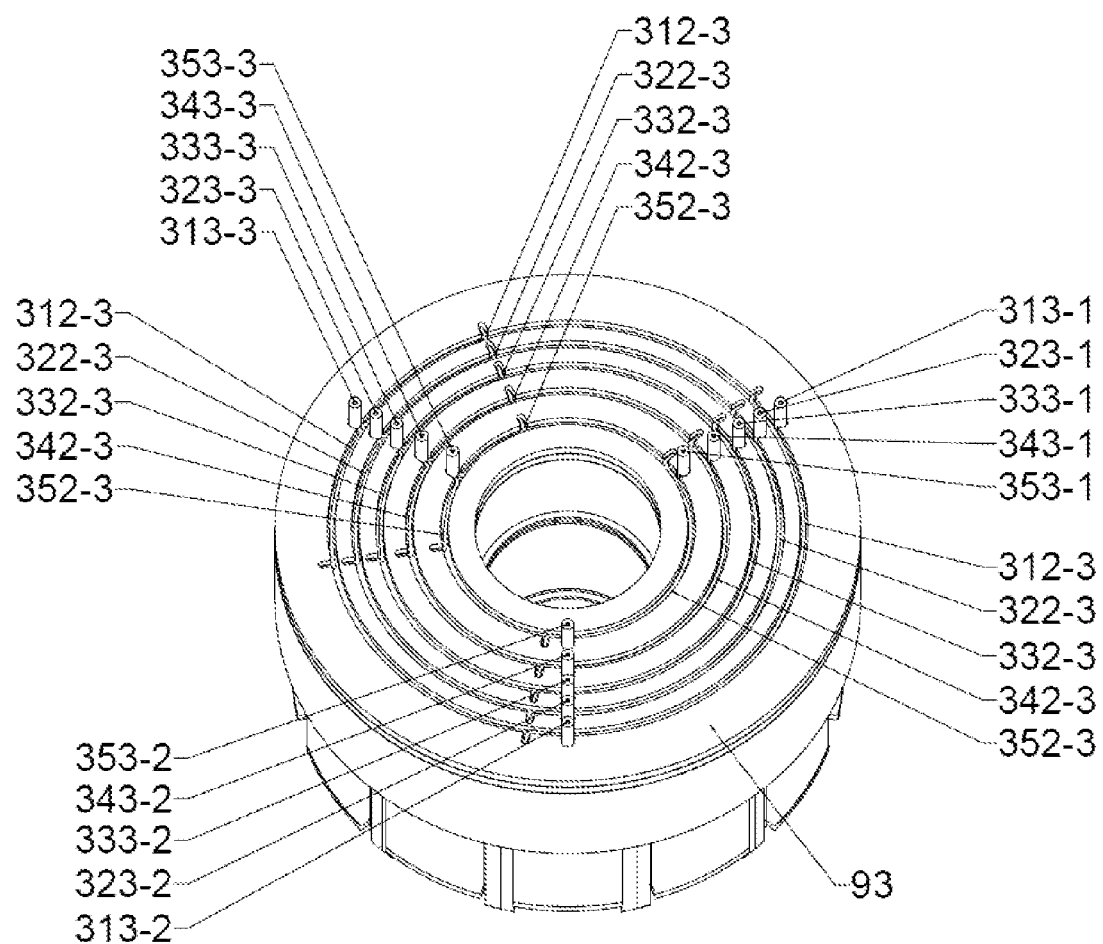
FIG. 6 is a three-dimensional view of the motor stator of FIG. 5 additionally covered by a third insulating layer lid.

As shown in FIG. 6, a third insulating layer lid 93 placed on top of layer lid 92 and the abovementioned second set of safe windings "Δ" connection wires (312-2, 322-2, 332-2, 342-2, 352-2) and provided with a plurality of holes to let the set of first phase axial insulated wires (313-1, 323-1, 333-1, 343-1, 353-1) and the set of second phase axial insulated wires (313-2, 323-2, 333-2, 343-2, 353-2) as well as the third set of safe windings "Δ" connection wires (312-3, 322-3, 332-3, 342-3, 352-3) to pass through the cap layer 93. The insulating cap layer 93 is additionally provided with a set of concentric circular grooves where the third set of safe windings "Δ" connection wires (312-3, 322-3, 332-3, 342-3, 352-3) lie and are connected to a set of third phase axial insulated wires (313-3, 323-3, 333-3, 343-3, 353-3).

Figure 7:
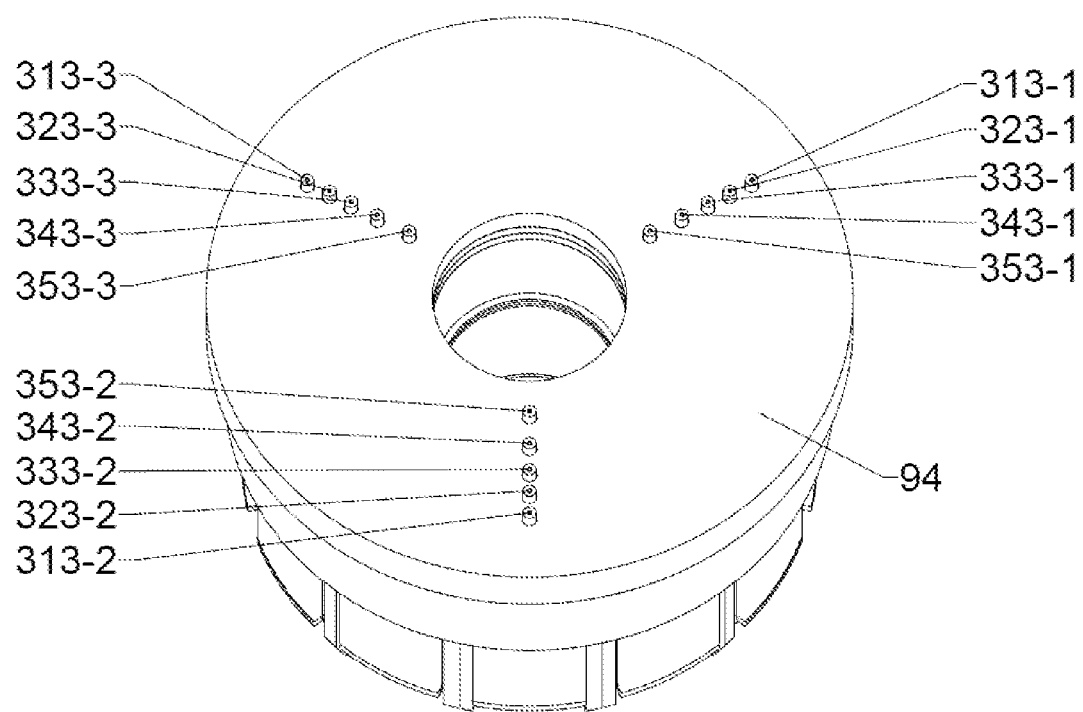
FIG. 7 is a three-dimensional view of the motor stator of FIG. 6 additionally covered by a fourth insulating layer lid.

As shown in FIG. 7, a fourth insulating layer lid 94 is provided on top of the third insulating layer lid 93 and the third set of safe windings "Δ" connection wires (312-3, 322-3, 332-3, 342-3, 352-3) and provided with a plurality of holes to let the set of first phase axial insulated wires (313-1, 323-1, 333-1, 343-1, 353-1), the set of second phase axial insulated wires (313-2, 323-2, 333-2, 343-2, 353-2), and the set of third phase axial insulated wires (313-3, 323-3, 333-3, 343-3, 353-3) pass through the insulating layer lid 94.

The repeated combination of concentric grooves and holes in each of the insulating layers lids (91, 92, 93, 94) has the advantage of maintaining the mandated separation distances between all individual safe circuits while enabling the necessary circuit connections.

The intrinsically safe electric device according to the present invention may also be employed as an intrinsically safe electric generator for multiple intrinsically safe circuits. As electrical energy generation in each of the individual safe circuits is proportional to the magnetization variation frequency, current and voltage of every single circuit composed of safe windings can be limited by limiting the rotational speed of the permanent magnet rotor.

What is claimed is:

1. An intrinsically safe electromagnetic device comprising:
    a ferromagnetic core including an arm;
    first and second safe coils that are each wound about the arm and respectively electrically connected to first and second independent electrical power supplies to form respective first and second intrinsically safe circuits with each of the first and second independent electrical power supplies having a maximal voltage and a short-circuit current under a limit ignition curve corresponding to a total equivalent inductance of the respective first and second safe coils, there existing no electrical connection between the first and second safe coils; and
    one or more insulators that electrically insulate the first and second safe coils from the arm and that insulate the first and second safe coils from one another.

2. The intrinsically safe electromagnetic device according to claim 1, wherein the electromagnetic device is a motor having a stator, the stator comprising the ferromagnetic core.

3. The intrinsically safe electromagnetic device according to claim 2, wherein the first and second safe coils are radially displaced from one another.

4. The intrinsically safe electromagnetic device according to claim 2, wherein the ferromagnetic core includes a plurality of arms that are angularly displaced from one another, each of the first and second safe coils being wound about two or more of the plurality of arms, the one or more insulators electrically insulating the first and second safe coils from the two or more of the plurality of arms.

5. The intrinsically safe electromagnetic device according to claim 3, wherein the ferromagnetic core includes a plurality of arms that are angularly displaced from one another, each of the first and second safe coils being wound about two or more of the plurality of arms; the one or more insulators electrically insulating the first and second safe coils from the two or more of the plurality of arms.

6. The intrinsically safe electromagnetic device according to claim 3, wherein the stator has a central axis, the one or more insulators that electrically insulate the first and second safe coils from one another extending axially between the first and second safe coils.

7. The intrinsically safe electromagnetic device according to claim 4, wherein the one or more insulators comprise a monolithic structure.

8. The intrinsically safe electromagnetic device according to claim 5, wherein the one or more insulators comprise a monolithic structure.

9. The intrinsically safe electromagnetic device according to claim 5, wherein the stator further comprises a central axis and one or more electrical insulating lids that each has one or more holes through which one or more connecting wires axially pass, the one or more connecting wires being electrically coupled to one or more of the first and second safe coils.

10. The intrinsically safe electromagnetic device according to claim 2, wherein the first and second intrinsically safe circuits are connected in a multiphase configuration to respective first and second electronic speed controllers that are each electrically powered by respective first and second independent intrinsically safe batteries.

11. The intrinsically safe electromagnetic device according to claim 10, further comprising a controller that is electrically powered by a third independent intrinsically safe battery, the controller being electronically coupled by first and second electrically insulated wires to the first and second electronic speed controllers in parallel, the controller being configured to produce one or more control signals that are deliverable to the respective first and second electronic speed controllers through the first and second electrically insulated wires.

12. The intrinsically safe electromagnetic device according to claim 2, wherein the motor comprises a rotor at least partially housed inside a central opening of the stator, the rotor including a plurality of permanent magnets and being configured to rotate inside the stator.

13. The intrinsically safe electromagnetic device according to claim 2, wherein the motor comprises a rotor surrounding the stator, the rotor including a plurality of permanent magnets and being configured to rotate around the stator.

14. The intrinsically safe electromagnetic device according to claim 1, wherein the electromagnetic device is used to generate electrical energy.

15. The intrinsically safe electromagnetic device according to claim 1, wherein the electromagnetic device is an electromagnetic actuator of an electrically actuated valve.

16. The intrinsically safe electromagnetic device according to claim 1, wherein the electromagnetic device is a transformer.

17. The intrinsically safe electromagnetic device according to claim 1, wherein the ferromagnetic core is encased by the one or more insulators.

18. The intrinsically safe electromagnetic device according to claim 9, wherein the one or more electrically insulating lids further comprise transverse grooves through which the connecting wires pass, the transverse grooves spaced to maintain separation distances between the connecting wires.

19. The intrinsically safe electromagnetic device according to claim 4, wherein the coils of the first safe coil that are wound about the two or more plurality of arms are serially connected by a first electrically insulated wire and the coils of the second safe coil that are wound about the two or more plurality of arms are serially connected by a second electrically insulated wire.

20. An intrinsically safe electromagnetic device comprising:
a ferromagnetic core including at least three arms that are angularly displaced from one another;
at least first, second and third safe coils that are each wound about the at least three arms of the ferromagnetic core and respectively electrically connected to first, second and third independent electrical power supplies to form respective first, second and third intrinsically safe circuits with each of the first, second and third independent electrical power supplies having a maximal voltage and a short-circuit current under a limit ignition curve corresponding to a total equivalent inductance of the respective first, second and third safe coils, there existing no electrical connection between the first, second and third safe coils; and
a plurality of insulators that electrically insulate the first, second and third safe coils from the first, second and third arms and that insulate the first, second and third safe coils from one another.

* * * * *